(12) United States Patent
Yan

(10) Patent No.: US 12,330,464 B2
(45) Date of Patent: Jun. 17, 2025

(54) SYSTEM AND METHOD FOR DETERMINING A DISPLACEMENT VELOCITY SIGNAL, AND ACTIVE WHEEL SUSPENSION

(71) Applicant: Ford Global Technologies, LLC, Dearborn, MI (US)

(72) Inventor: Shi Yan, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 447 days.

(21) Appl. No.: 17/854,747

(22) Filed: Jun. 30, 2022

(65) Prior Publication Data

US 2023/0001760 A1  Jan. 5, 2023

(30) Foreign Application Priority Data

Jul. 2, 2021 (DE) .................. 102021117078.8

(51) Int. Cl.
*B60G 17/018* (2006.01)
*B60G 17/019* (2006.01)

(52) U.S. Cl.
CPC ... *B60G 17/0182* (2013.01); *B60G 17/01908* (2013.01); *B60G 17/01933* (2013.01); *B60G 2400/102* (2013.01); *B60G 2400/202* (2013.01); *B60G 2400/252* (2013.01); *B60G 2600/09* (2013.01); *B60G 2600/1871* (2013.01); *B60G 2600/68* (2013.01); *B60G 2800/702* (2013.01)

(58) Field of Classification Search
CPC .......... B60G 17/0182; B60G 17/01908; B60G 2400/102; B60G 2400/202; B60G 2400/252; B60G 2600/09; B60G 2600/1871; B60G 2600/68; B60G 2800/702
See application file for complete search history.

(56) References Cited

FOREIGN PATENT DOCUMENTS

JP      2010195323 A      9/2010
WO   WO-2005029001 A1 *  3/2005   ........... G01C 21/165

OTHER PUBLICATIONS

Suzuki, JP 2010-195323, machine translation. (Year: 2010).*

* cited by examiner

*Primary Examiner* — Mark L. Greene
(74) *Attorney, Agent, or Firm* — Burr & Forman LLP; Lorne Forsythe

(57) ABSTRACT

A system for determining a displacement velocity signal for controlling an active wheel suspension of a land vehicle by open-loop and/or closed-loop control includes at least one Kalman filter, and at least one acceleration sensor arranged on a sprung mass of the land vehicle to sense a vertical acceleration of the sprung mass and to generate a corresponding acceleration signal supplied to the Kalman filter. The Kalman filter includes a mathematical motion model of the sprung mass, and input states of the Kalman filter include a vertical acceleration of the sprung mass, a vertical displacement velocity of the sprung mass, and a vertical displacement distance of the sprung mass. A displacement measurement signal having a value 0 is supplied continuously to the Kalman filter to determine the displacement velocity signal. Constant noise variance values of a measurement noise covariance matrix of the Kalman filter that are assigned to the displacement measurement signal are, in each case, set at one half of a maximum vertical displacement distance of the sprung mass.

5 Claims, 1 Drawing Sheet

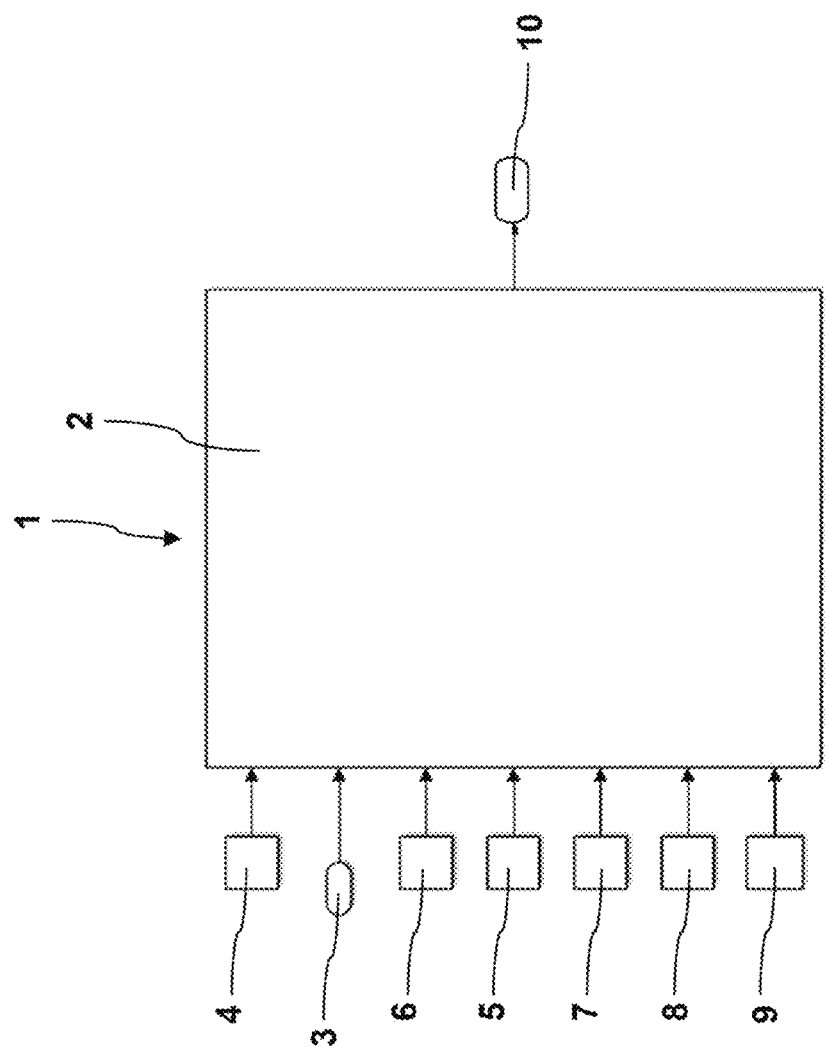

SYSTEM AND METHOD FOR DETERMINING A DISPLACEMENT VELOCITY SIGNAL, AND ACTIVE WHEEL SUSPENSION

TECHNICAL FIELD

Example embodiments generally relate to a system for determining a displacement velocity signal for controlling an active wheel suspension of a land vehicle by open-loop and/or closed-loop control, having at least one Kalman filter, and at least one acceleration sensor, which can be arranged on a sprung mass of the land vehicle, for sensing a vertical acceleration of the sprung mass and for generating a corresponding acceleration signal, which acceleration signal can be supplied to the Kalman filter. In addition, the invention relates to an active wheel suspension for a land vehicle, having at least one system for determining a displacement velocity signal with respect to a vertical displacement of a sprung mass of the land vehicle. Further, the invention relates to a method for determining a displacement velocity signal for controlling an active wheel suspension of a land vehicle by open-loop and/or closed-loop control, a vertical acceleration of a sprung mass of the land vehicle being sensed, and an acceleration signal corresponding to the vertical acceleration being generated and supplied to a Kalman filter.

BACKGROUND

For the performance of an active wheel suspension of a land vehicle, it is helpful to determine a high-quality displacement velocity signal with respect to a vertical displacement of a sprung mass of the land vehicle and to use it to control the active wheel suspension by open-loop and/or closed-loop control. This allows actuators of the active wheel suspension to be controlled with greater accuracy. The generation of accurate velocity signals relating to motions of the sprung mass of a land vehicle, in particular a vertical displacement velocity signal, a roll angle velocity signal and a pitch angle velocity signal, makes it possible to generate more accurate control-force and torque requirements, for example so-called skyhook force requirements, based on such a velocity signal as an input signal. If a reference body velocity signal from which control force requirements are generated is not accurate, the control force requirements will not be accurate either, resulting in a degradation of the achievable ride comfort.

A high-quality displacement velocity signal also enables accurate generation of a damping force requirement. In addition, such a displacement velocity signal makes it possible to improve the accuracy of skyhook force requirements and torque requirements, which is aimed solely at controlling body movements and improving passenger comfort.

The displacement velocity of the sprung mass of a land vehicle cannot usually be measured directly, as there is no sensor for the displacement velocity. Therefore, the displacement velocity is conventionally determined, for example, by performing a mathematical integration over time of an acceleration signal, sensed by an acceleration sensor, to a vertical acceleration of the sprung mass. This approach must be combined with high-pass filtering in order to remove the drift introduced by the integration process. One problem with high-pass filtering, however, is that it alters the waveform of the displacement velocity signal, or severely distorts the displacement velocity signal, because low-frequency components are removed. If, for example, a skyhook closed-loop control is used to control an active wheel suspension by closed-loop control, the ride comfort is not optimized because the displacement velocity signal that is essential for this deviates significantly from the real displacement velocity of the sprung mass. Consequently, the conventional generation of a displacement velocity signal by high-pass filtering of the acceleration measurement signal of the acceleration sensor by integration over time does not in itself enable satisfactory generation of the displacement velocity signal.

A Kalman filter may outperform a simple Butterworth filter, but only if at least two measurement signals are supplied to the Kalman filter. Since usually only one measurement signal is available in the form of the vertical acceleration measurement signal, another measurement signal is required to make a Kalman filter usable instead of simple integration and high-pass filtering. For this purpose, an approach with a Kalman filter is proposed, for example, in JP 2010 195 323 A, in which a mathematical vehicle model represents an additional observation source in addition to an acceleration measurement signal. The disadvantage of this approach, however, is the associated high computational load that is required for the resulting Kalman filter.

Based on the discussion above, it may be desirable to enhance the performance of an active wheel suspension of a land vehicle.

BRIEF SUMMARY OF SOME EXAMPLES

A system for determining a displacement velocity signal for controlling an active wheel suspension of a land vehicle by open-loop and/or closed-loop control includes at least one Kalman filter, and at least one acceleration sensor arranged on a sprung mass of the land vehicle to sense a vertical acceleration of the sprung mass and to generate a corresponding acceleration signal supplied to the Kalman filter. The Kalman filter includes a mathematical motion model of the sprung mass, and input states of the Kalman filter include a vertical acceleration of the sprung mass, a vertical displacement velocity of the sprung mass, and a vertical displacement distance of the sprung mass. A displacement measurement signal having a value 0 is supplied continuously to the Kalman filter to determine the displacement velocity signal. Constant noise variance values of a measurement noise covariance matrix of the Kalman filter that are assigned to the displacement measurement signal are, in each case, set at one half of a maximum vertical displacement distance of the sprung mass.

A method for determining a displacement velocity signal for controlling an active wheel suspension of a land vehicle by open-loop and/or closed-loop control includes sensing a vertical acceleration of a sprung mass of the land vehicle, generating an acceleration signal corresponding to the vertical acceleration, applying the acceleration signal to a Kalman filter operated with a mathematical motion model of the sprung mass, and continuously applying a displacement measurement signal having a value 0 to the Kalman filter to determine the displacement velocity signal. The Kalman filter has input states including a vertical acceleration of the sprung mass, a vertical displacement velocity of the sprung mass, and a vertical displacement distance of the sprung mass. Constant noise variance values of a measurement noise covariance matrix of the Kalman filter that are assigned to the displacement measurement signal are, in each case, set at one half of a maximum vertical displacement distance of the sprung mass.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 shows a block diagram of a system according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. It should be noted that the features and measures presented individually in the following description can be combined in any technically feasible manner, giving rise to further embodiments of the invention. The description additionally characterizes and specifies aspects of some example embodiments, particularly in conjunction with the figures.

As noted above, example embodiments may provide a system according to which a Kalman filter includes a mathematical motion model of the sprung mass of a vehicle, the states of which are vertical acceleration of the sprung mass, a vertical displacement velocity of the sprung mass and a vertical displacement distance of the sprung mass, a displacement measurement signal having the value 0 being able to be supplied continuously to the Kalman filter for the purpose of determining the displacement velocity signal, and constant noise variance values of a measurement noise covariance matrix of the Kalman filter that are assigned to the displacement measurement signal being in each case set at one half of a maximum vertical displacement distance of the sprung mass.

With the system according to example embodiments, a higher-quality displacement velocity signal is generated, in that the Kalman filter is operated, inter alia, with a simple mathematical motion model of the sprung mass of the land vehicle instead of with a complicated mathematical vehicle model. Moreover, in addition to the acceleration measurement signal, the Kalman filter is supplied with the displacement measurement signal equal to 0, which is not a real measurement signal, since no displacement measurement takes place, but is continuously kept at the constant value 0 without displacement measurement. Further, the constant noise variance values of a measurement noise covariance matrix of the Kalman filter that are assigned to the displacement measurement signal are in each case set at one half of a maximum vertical displacement distance of the sprung mass. These high noise variance values mean that the exact vertical position of the sprung mass is not known, but oscillates around the position assigned to the displacement measurement value 0, the latter position (0-position) being assumed to be the observed, or measured, position. The Kalman filter used according to example embodiments, or the mathematical model included in example embodiments, is thus very small and therefore not computationally intensive, such that the displacement velocity signal comes very close to the real displacement velocity of the sprung mass, this resulting in a significantly better ride comfort, for example, when the classic skyhook closed-loop control is used. Moreover, the Kalman filter can be realized relatively easily.

The system according to an example embodiment can be used to enhance the performance of an active wheel suspension, for example for controlling a continuously controlled damping (CCD), an active suspension and/or an actively controlled stabilizer of the active wheel suspension by open-loop and/or closed-loop control. The system according to example embodiments can be used in a land vehicle, for example in a commercial vehicle, a passenger car, a motorcycle, or in a train. Alternatively, the system according to example embodiments can also be used for closed-loop motion control in a robot.

The mathematical motion model of the sprung mass may be defined as follows:

$$X_k = \begin{bmatrix} s_k \\ v_k \\ a_k \end{bmatrix} = \begin{bmatrix} 1 & T & 0 \\ 0 & 1 & T \\ 0 & 0 & 1 \end{bmatrix} \cdot \begin{bmatrix} s_{k-1} \\ v_{k-1} \\ a_{k-1} \end{bmatrix} + \begin{bmatrix} 0 \\ 0 \\ 1 \end{bmatrix} \cdot W_{k-1},$$

where $X_k$ is a state vector of an estimated motion state of the sprung mass relating to the state measurement k with the estimated states $s_k$, $v_k$ and $a_k$, and where $s_k$ is a vertical displacement distance of the sprung mass, $v_k$ is a vertical displacement velocity of the sprung mass, and $a_k$ is a vertical acceleration of the sprung mass. In addition, $s_{k-1}$ is a vertical displacement distance of the sprung mass, $v_{k-1}$ is a vertical velocity of the sprung mass, and $a_{k-1}$ is a vertical acceleration of the sprung mass relating to a previous state measurement k−1. Furthermore, T is a sampling time and $W_{k-1}$ is a random uncorrelated value. The displacement velocity $v_k$ of the current measurement is thus defined by an integration over time of the vertical acceleration $a_{k-1}$ of the previous measurement. The displacement distance $s_k$ of the current measurement is defined by an integration over time of the vertical velocity $v_k$ of the preceding measurement.

This Kalman filter approach can be used to calculate, or determine, a vertical displacement velocity of the sprung mass, a roll angle velocity of the sprung mass and a pitch angle velocity of the sprung mass. Alternatively, each of these three velocities could be determined by use of its own, or a separate, Kalman filter with a simplified mathematical model, each of which can be operated separately and with different noise variance values, with the vertical displacement travel having to be converted into a roll angle and a pitch angle. Those Kalman filters that calculate both angular velocities must also be supplied with a calculated angular acceleration that corresponds to a quotient resulting from a difference of two acceleration sensor signals and a distance between these two acceleration sensors.

According to an example embodiment, the above object is additionally achieved by an active wheel suspension, which comprises at least one above-mentioned system for determining a displacement velocity signal with respect to a vertical displacement of a sprung mass of the land vehicle.

Some advantages mentioned above with regard to the system are correspondingly associated with the active wheel suspension.

According to an example embodiment, the above object is further achieved by a method described herein, according to which the Kalman filter is operated with a mathematical motion model of the sprung mass, the states of which are a vertical acceleration of the sprung mass, a vertical displacement velocity of the sprung mass and a vertical displacement distance of the sprung mass, a displacement measurement signal having the value 0 being supplied continuously to the Kalman filter for the purpose of determining the displacement velocity signal, and constant noise variance values of a measurement noise covariance matrix of the Kalman filter that are assigned to the displacement measurement signal being in each case set at one half of a maximum vertical displacement distance of the sprung mass. Some advantages mentioned above with regard to the system are correspondingly associated with the method. In particular, the above-mentioned system can be used to execute the method.

FIG. 1 shows a block diagram of an exemplary embodiment for a system 1 according to an example embodiment for determining a displacement velocity signal 10 for controlling an active wheel suspension, not shown, of a land vehicle, not shown, by open-loop and/or closed-loop control.

The system 1 has a Kalman filter 2, and has an acceleration sensor 3 that can be arranged on a sprung mass, not shown, of the land vehicle, for sensing a vertical acceleration of the sprung mass and for generating a corresponding acceleration signal, which acceleration signal can be supplied to the Kalman filter 2.

The Kalman filter 2 includes a mathematical motion model of the sprung mass, the states of which are a vertical acceleration of the sprung mass, a vertical displacement velocity of the sprung mass and a vertical displacement distance of the sprung mass.

For the purpose of determining the displacement velocity signal 10, a displacement measurement signal 4 having the value 0 is supplied continuously to the Kalman filter 2. Constant noise variance values 5 of a measurement noise covariance matrix of the Kalman filter 2 that are assigned to the displacement measurement signal 4 are in each case set at one half of a maximum vertical displacement distance of the sprung mass.

Also supplied to the Kalman filter 2 are a sampling time 6, a displacement velocity covariance 7, noise variance values 8, assigned to the acceleration measurement signal, for a further measurement noise covariance matrix of the Kalman filter 2, and a process error variance 9.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A system for determining a displacement velocity signal for controlling an active wheel suspension of a land vehicle by open-loop and/or closed-loop control, the system comprising:
    at least one Kalman filter, and
    at least one acceleration sensor, the at least one acceleration sensor being arranged on a sprung mass of the land vehicle to sense a vertical acceleration of the sprung mass and to generate a corresponding acceleration signal supplied to the Kalman filter,
    wherein the Kalman filter includes a mathematical motion model of the sprung mass, and input states of the Kalman filter include:
    a vertical acceleration of the sprung mass,
    a vertical displacement velocity of the sprung mass, and
    a vertical displacement distance of the sprung mass,
    wherein a displacement measurement signal having a value 0 is supplied continuously to the Kalman filter to determine the displacement velocity signal, and
    wherein constant noise variance values of a measurement noise covariance matrix of the Kalman filter that are assigned to the displacement measurement signal are, set at one half of a maximum vertical displacement distance of the sprung mass, and
    wherein the system controls a continuously controlled damping or the active wheel suspension of the land vehicle suspension based on the determined displacement velocity signal.

2. The system of claim 1, wherein the mathematical motion model comprises:

$$X_k = \begin{bmatrix} s_k \\ v_k \\ a_k \end{bmatrix} = \begin{bmatrix} 1 & T & 0 \\ 0 & 1 & T \\ 0 & 0 & 1 \end{bmatrix} \cdot \begin{bmatrix} s_{k-1} \\ v_{k-1} \\ a_{k-1} \end{bmatrix} + \begin{bmatrix} 0 \\ 0 \\ 1 \end{bmatrix} \cdot W_{k-1},$$

wherein $X_k$ is a state vector of an estimated motion state of the sprung mass relating to the state measurement k,
wherein the estimated motion state includes $s_k$, $v_k$ and $a_k$, and
wherein $s_k$ is the vertical displacement distance of the sprung mass, $v_k$ is the vertical displacement velocity of the sprung mass, $W_{k-1}$ is a random uncorrelated value, and $a_k$ is the vertical acceleration of the sprung mass.

3. An active wheel suspension for a land vehicle having the system of claim 1.

4. A method for determining a displacement velocity signal for controlling an active wheel suspension of a land vehicle by open-loop and/or closed-loop control, the method comprising:
    sensing a vertical acceleration of a sprung mass of the land vehicle;

generating an acceleration signal corresponding to the vertical acceleration;

applying the acceleration signal to a Kalman filter operated with a mathematical motion model of the sprung mass; and continuously applying a displacement measurement signal having a value 0 to the Kalman filter to determine the displacement velocity signal; and controlling a continuously controlled damping or the active wheel suspension of the land vehicle based on the determined displacement velocity signal, wherein the Kalman filter has input states including:

a vertical acceleration of the sprung mass, a vertical displacement velocity of the sprung mass, a vertical displacement distance of the sprung mass, and wherein constant noise variance values of a measurement noise covariance matrix of the Kalman filter that are assigned to the displacement measurement signal are, set at one half of a maximum vertical displacement distance of the sprung mass.

5. The method of claim 4, wherein the mathematical motion model comprises:

$$X_k = \begin{bmatrix} s_k \\ v_k \\ a_k \end{bmatrix} = \begin{bmatrix} 1 & T & 0 \\ 0 & 1 & T \\ 0 & 0 & 1 \end{bmatrix} \cdot \begin{bmatrix} s_{k-1} \\ v_{k-1} \\ a_{k-1} \end{bmatrix} + \begin{bmatrix} 0 \\ 0 \\ 1 \end{bmatrix} \cdot W_{k-1},$$

wherein $X_k$ is a state vector of an estimated motion state of the sprung mass relating to the state measurement k, wherein the estimated motion state includes $s_k$, $v_k$ and $a_k$, and wherein $s_k$ is the vertical displacement distance of the sprung mass, $v_k$ is the vertical displacement velocity of the sprung mass, $W_{k-1}$ is a random uncorrelated value, and $a_k$ is the vertical acceleration of the sprung mass.

* * * * *

UNITED STATES PATENT AND TRADEMARK OFFICE
CERTIFICATE OF CORRECTION

| | | |
|---|---|---|
| PATENT NO. | : 12,330,464 B2 | Page 1 of 1 |
| APPLICATION NO. | : 17/854747 | |
| DATED | : June 17, 2025 | |
| INVENTOR(S) | : Shi Yan | |

It is certified that error appears in the above-identified patent and that said Letters Patent is hereby corrected as shown below:

In the Claims

In Column 6, Claim 1, Line 34, "and wherein constant noise" should read --wherein constant noise--

Signed and Sealed this
Eleventh Day of November, 2025

John A. Squires
*Director of the United States Patent and Trademark Office*